(12) United States Patent
Wood

(10) Patent No.: US 10,719,519 B2
(45) Date of Patent: Jul. 21, 2020

(54) NAVIGATION SYSTEM WITH SUGGESTION MECHANISM AND METHOD OF OPERATION THEREOF

(71) Applicant: Telenav, Inc., Sunnyvale, CA (US)

(72) Inventor: Eric Wood, Menlo Park, CA (US)

(73) Assignee: Telenav, Inc., Santa Clara, CA (US)

( * ) Notice: Subject to any disclaimer, the term of this patent is extended or adjusted under 35 U.S.C. 154(b) by 274 days.

(21) Appl. No.: 14/936,276

(22) Filed: Nov. 9, 2015

(65) Prior Publication Data
US 2016/0132562 A1 May 12, 2016

Related U.S. Application Data

(60) Provisional application No. 62/077,254, filed on Nov. 9, 2014.

(51) Int. Cl.
*G06F 16/00* (2019.01)
*G06F 16/2457* (2019.01)
*G06F 16/954* (2019.01)
*G06F 40/274* (2020.01)

(52) U.S. Cl.
CPC ...... *G06F 16/24575* (2019.01); *G06F 16/954* (2019.01); *G06F 40/274* (2020.01)

(58) Field of Classification Search
CPC .................................................. G06F 17/3087
See application file for complete search history.

(56) References Cited

U.S. PATENT DOCUMENTS

| | | | |
|---|---|---|---|
| 7,774,003 B1 | 8/2010 | Ortega et al. | |
| 9,134,135 B2 * | 9/2015 | Zhao | G01C 21/3641 |
| 2007/0019864 A1 * | 1/2007 | Koyama | G06F 17/30247 |
| | | | 382/218 |
| 2009/0055380 A1 † | 2/2009 | Peng et al. | |
| 2009/0249198 A1 * | 10/2009 | Davis | G06F 17/276 |
| | | | 715/261 |
| 2011/0063231 A1 * | 3/2011 | Jakobs | G06F 3/04883 |
| | | | 345/173 |
| 2011/0161829 A1 * | 6/2011 | Kristensen | G01C 21/3611 |
| | | | 715/739 |
| 2013/0218902 A1 * | 8/2013 | Vendrow | G06F 17/30867 |
| | | | 707/748 |
| 2015/0088412 A1 † | 3/2015 | Foster et al. | |
| 2015/0205828 A1 † | 7/2015 | Manciero et al. | |

\* cited by examiner
† cited by third party

*Primary Examiner* — Hung Q Pham
(74) *Attorney, Agent, or Firm* — Perspectives Law Group, Corp.

(57) ABSTRACT

A method of operation of a navigation system includes: determining a search context with a control unit for identifying the search context where a search request is made; determining a result pattern including a word complete over an autosuggestion based on the search context; and generating a search result including a suggestive component based on the result pattern for displaying on a device.

20 Claims, 6 Drawing Sheets

NAVIGATION SYSTEM WITH SUGGESTION MECHANISM AND METHOD OF OPERATION THEREOF

CROSS-REFERENCE TO RELATED APPLICATION(S)

This application claims the benefit of U.S. Provisional Patent Application Ser. No. 62/077,254 filed Nov. 9, 2014, and the subject matter thereof is incorporated herein by reference thereto.

TECHNICAL FIELD

The present invention relates generally to a navigation system, and more particularly to a system with suggestion mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without suggestion mechanism has become a paramount concern for the consumer. The inability decreases the benefit of using the tool.

Thus, a need still remains for a navigation system with suggestion mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a search context with a control unit for identifying the search context where a search request is made; determining a result pattern including a word complete over an autosuggestion based on the search context; and generating a search result including a suggestive component based on the result pattern for displaying on a device.

The present invention provides a navigation system, including: a control unit for: determining a search context with a control unit for identifying the search context where a search request is made, determining a result pattern including a word complete over an autosuggestion based on the search context, generating a search result including a suggestive component based on the result pattern, and a communication unit, coupled to the control unit, for communicating the search result 224 for displaying on a device.

The present invention provides a navigation system including a non-transitory computer readable medium including instructions for execution, the instructions comprising: determining a search context for identifying the search context where a search request is made; determining a result pattern including a word complete over an autosuggestion based on the search context; and generating a search result including a suggestive component based on the result pattern for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
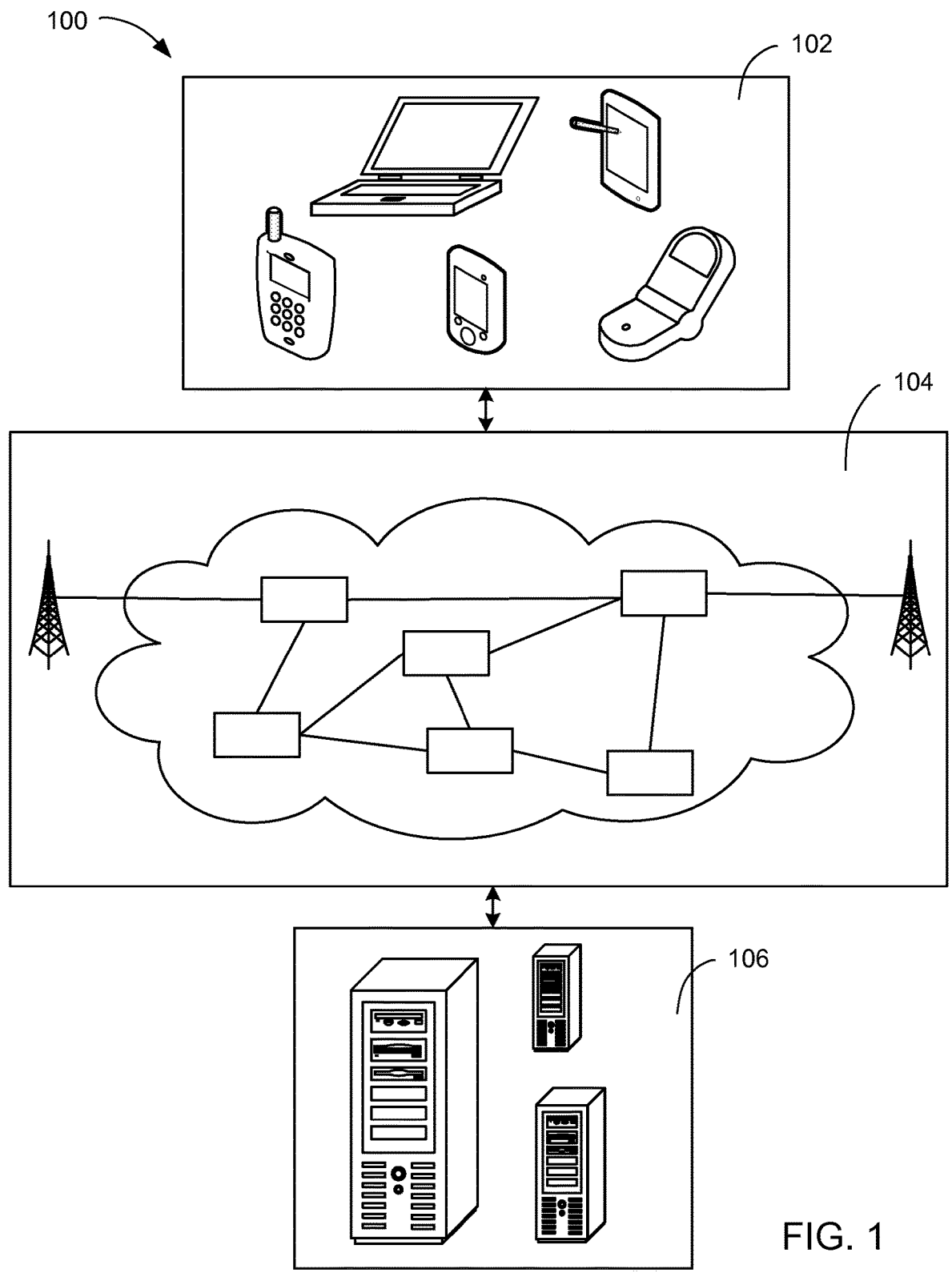
FIG. 1 is a navigation system with suggestion mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with suggestion mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
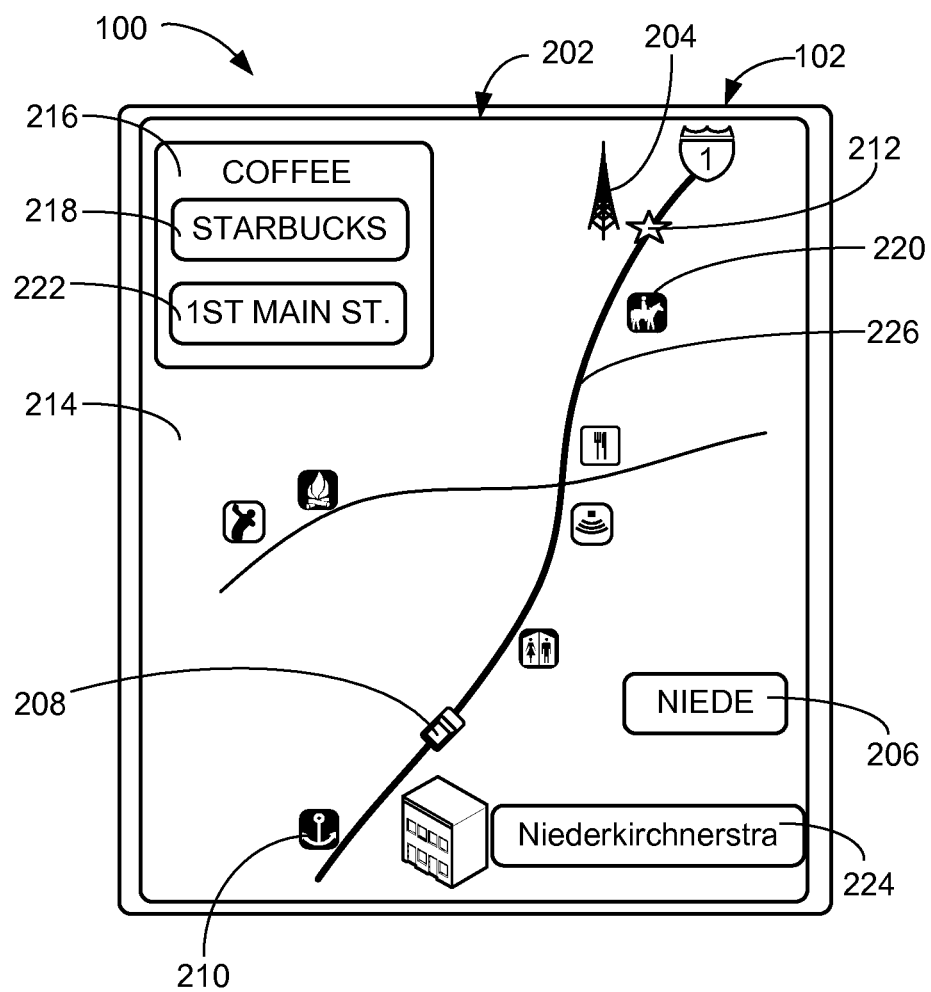
FIG. 2 is an example of a search context.

Referring now to FIG. 2, therein is shown an example of a search context 202. For clarity and brevity, the discussion of the embodiment of the present invention focuses on the first device 102 delivering the result generated by the navigation system 100. However, various embodiments of the present invention can easily be applied with the description with the second device 106 of FIG. 1 and the first device 102 interchangeably.

The search context 202 is defined as a situation or circumstance surrounding when and where a user accesses the navigation system 100. For example, the search context 202 can include a location type 204 where the user is at, a timeframe when a search request 206 is made, or a combination thereof. The timeframe can include a time of day, week, month, year, season, or a combination thereof.

The search request 206 is defined as a user entry made to the navigation system 100. For example, the search request 206 can be made by a manual input, an audio input, a gesture, or a combination thereof. For further example, the search request 206 can seek for the location type 204.

The navigation system 100 can digitally present the location type 204. The location type 204 is defined as a classification of a geographic place. For example, the location type 204 can include a current location 208, a starting location 210, a target destination 212, a geographic area 214, or a combination thereof. For further example, the location type 204 can include a category of interest 216, a brand name 218, a point of interest 220, or a combination thereof.

The current location 208 can represent a physical location of where the first device 102 is located. The starting location 210 is defined as a physical location of where the user of the first device 102 starts the travel. The target destination 212 is defined as a physical location of where the user of the first device 102 ends the travel. The geographic area 214 is defined as a region covered by the navigation system 100. For example, the geographic area 214 can include the location type 204 where the search request 206 is made, where the user is traveling, where the first device 102 is detected, or a combination thereof.

The category of interest 216 is defined as a classification of the point of interest 220. The point of interest 220 can represent a physical location interested by the user of the navigation system 100. The brand name 218 can represent a name, term, design, symbol or other feature that distinguishes one seller's product from those of others. More specifically as an example, the brand name 218 can represent a type of the category of interest 216.

The location type 204 can include an address information 222. The address information 222 is defined as an alphanumeric information designated to a physical location. For example, the navigation system 100 can generate a search result 224 representing the address information 222.

The search result 224 is defined as an outcome of the search request 206. For example, the search result 224 can include the address information 222, the brand name 218, the category of interest 216, or a combination thereof.

A navigation output 226 is defined as an information to reach the location type 204. For example, the navigation output 226 can include a route, guidance, visual display, audio output, or a combination thereof to reach the target destination 212, the point of interest 220, or a combination thereof.

Figure 3:
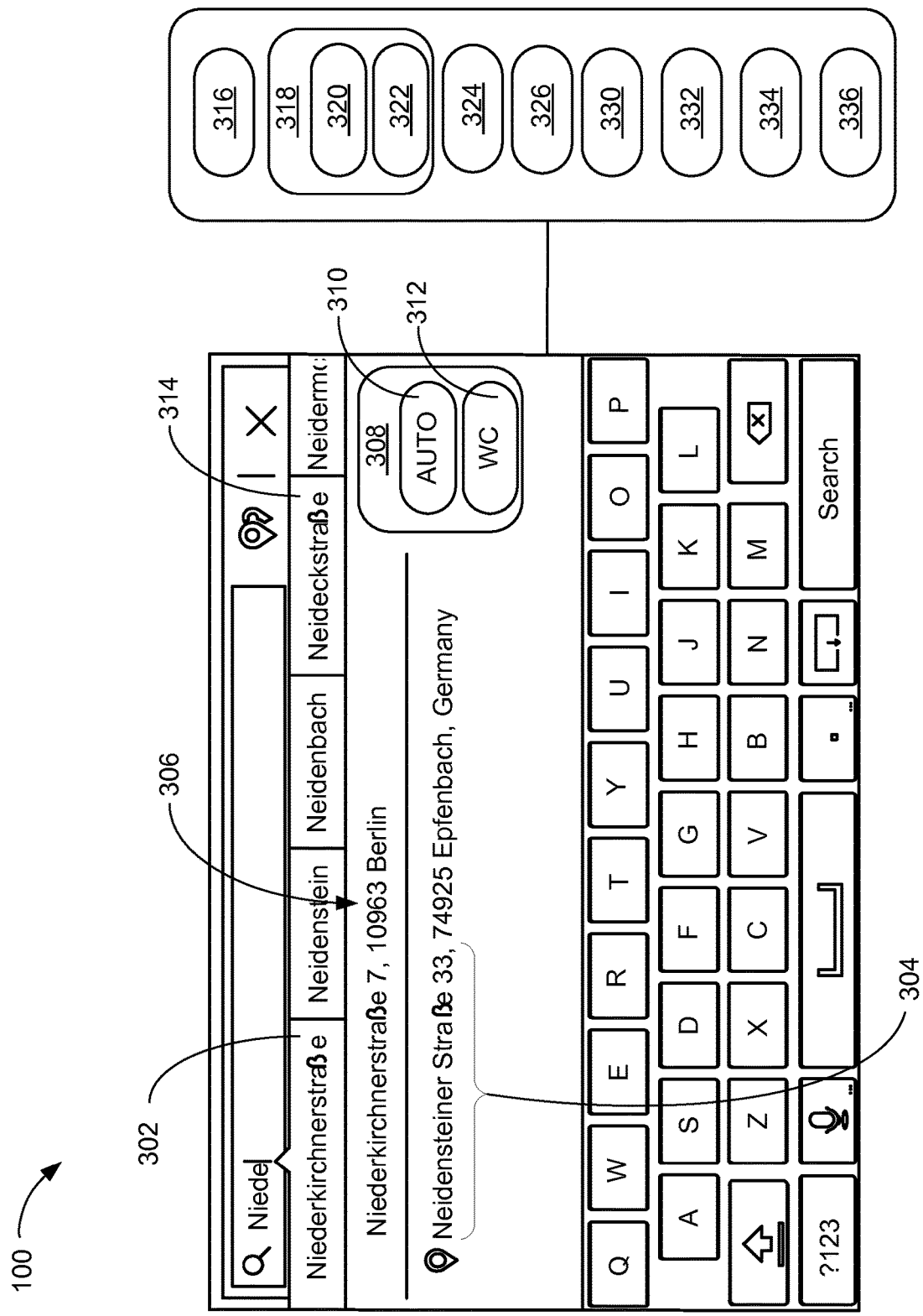
FIG. 3 is an example of a suggestive result.

Referring now to FIG. 3, therein is shown an example of a suggestive result 302. The suggestive result 302 is defined as the search result 224 of FIG. 2 presented in a form of recommendation. For example, the user can accept or decline the suggestive result 302 as the search result 224. More specifically as an example, the suggestive result 302 is an example of the search result 224.

The suggestive result 302 can include a result pattern 304. The result pattern 304 is defined as an arrangement that configures the search result 224. For example, the result pattern 304 can be an arrangement of a result component 306. The result component 306 is defined as a subset information arranged into the search result 224. For example, the result component 306 can represent the building number for the address information 222 of FIG. 2.

The result pattern 304 can include a suggestion type 308. The suggestion type 308 is defined as a classification of the suggestive result 302. The suggestion type 308 can include an autosuggestion 310, a word complete 312, or a combination thereof. The autosuggestion 310 is defined as a complete recommendation factored in generation of the suggestive result 302. More specifically as an example, the autosuggestion 310 can represent a suggestion including full information. For example, the autosuggestion 310 can represent the complete instance of the address information 222 for the point of interest 220.

The word complete 312 is defined as a partial recommendation factored in generation of the suggestive result 302. More specifically as an example, the word complete 312 can represent a suggestion including partial information. For example, the word complete 312 can include a suggestive component 314.

The suggestive component 314 is defined as partial information presented to the user as the suggestive result 302. For example, the suggestive component 314 can include an alphanumeric value, a partial instance of the address information 222, or a combination thereof. More specifically as an example, the suggestive component 314 can represent a character, a number, or a combination thereof as the suggestive result 302 presented to the user. For a different example, the suggestive component 314 can represent a partial information of the address information 222, such as, a street number, a building, or a combination thereof.

An activity history 316 is defined as a record of activity performed. For example, the activity history 316 can represent the search request 206 made to the navigation system 100. A dictionary type 318 is a classification of a dictionary. For example, the dictionary type 318 can include a local dictionary 320, a generic dictionary 322, or a combination thereof.

The local dictionary 320 can represent a dictionary tailored for the specific instance of the location type 204 of FIG. 2. For example, the local dictionary 320 can include a list of words particular to the geographic area 214. The generic dictionary 322 can represent a dictionary unspecific to the location type 204. For example, the generic dictionary 322 can include a list of words generally used.

A selection count 324 is defined as a number of times the search result 224 is selected. More specifically as an example, the navigation system 100 can track the number of times the search result 224 is accepted by the user as the selection count 324. A selection threshold 326 is defined as a requirement or limit for the selection count 324. For example, the selection threshold 326 can represent a minimum or maximum number of the selection count 324.

An entry count 330 is defined as a number of character included in the search request 206. A character count 332 is defined as a number of character included in the search result 224. A count threshold 334 is a requirement or limit for a number of character. For example, the count threshold 334 can represent a minimum or maximum number character for the entry count 330, the character count 332, or a combination thereof.

A match degree 336 is defined as a level of similarity. For example, the match degree 336 can represent an exact match between the search request 206 and the content of the local dictionary 320. The match degree 336 can be represented granularly to illustrate a range of similarity in alphanumeric value. For example, the match degree 336 represent an exact match can represent 100% while no match can represent 0%.

Figure 4:
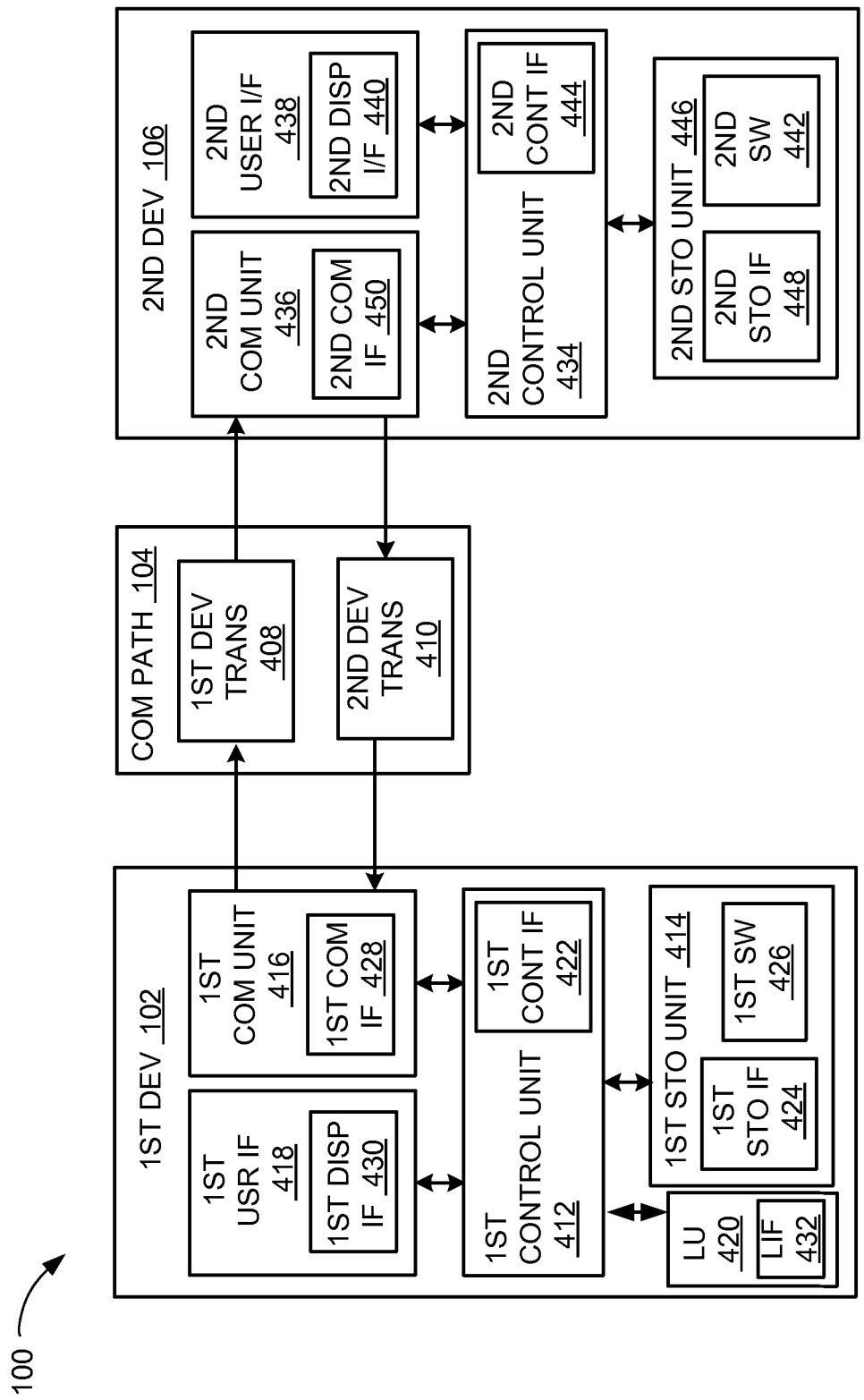
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106.

The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
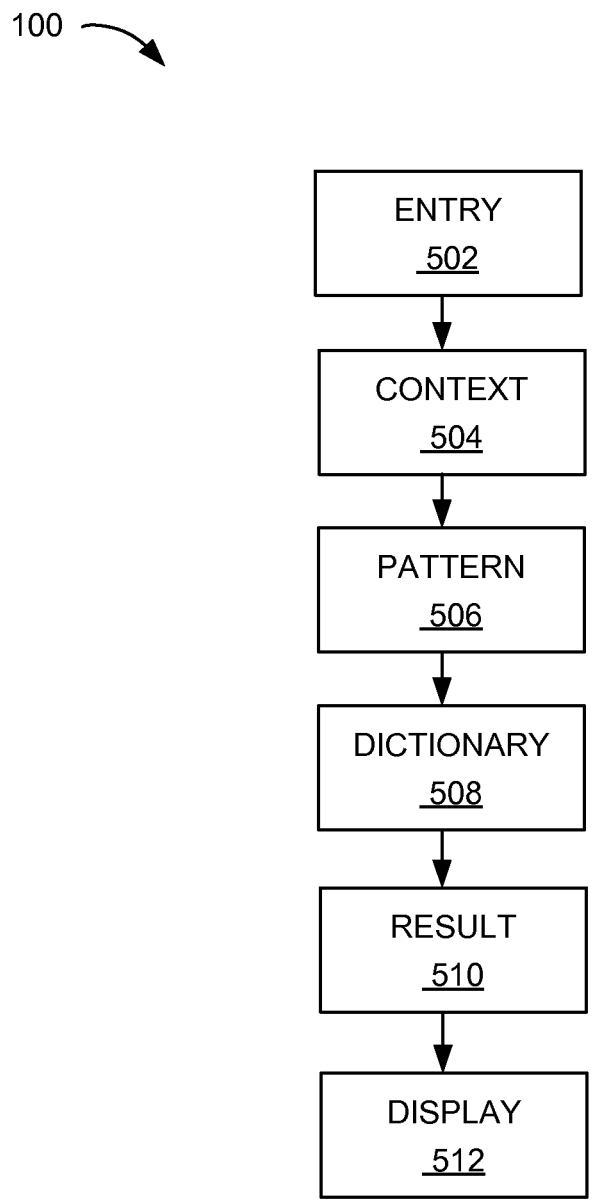
FIG. 5 is a control flow of the navigation system.

Referring now to FIG. 5, therein is shown a control flow of the navigation system 100. The navigation system 100 can include an entry module 502. The entry module 502 receives the search request 206 of FIG. 2. For example, the search request 206 can represent a manual input, an audio input, a gesture, or a combination thereof.

For further example, the search request 206 can represent the manual input of entering each alphabet for a particular language one by one. The entry module 502 can receive the search request 206 representing a single entry representing per character for the particular language. The entry module 502 can communicate the search request 206 to a context module 504.

The navigation system 100 can include the context module 504, which can couple to the entry module 502. The context module 504 determines the search context 202 of FIG. 2. For example, the context module 504 can determine the search context 202 based on the search request 206.

The context module 504 can determine the search context 202 in a number of ways. For example, the context module 504 can determine the search context 202 based on the search request 206 made on the first device 102 of FIG. 1. More specifically as an example, the search request 206 can indicate the user's intent. The search request 206 can include the address information 222 of FIG. 2 of the target destination 212 of FIG. 2, the category of interest 216 of FIG. 2, the brand name 218 of FIG. 2, the point of interest 220 of FIG. 2, or a combination thereof. Based on the search request 206, the context module 504 can determine a type of the search result 224 of FIG. 2 the user may be seeking.

For a specific example, the search request 206 can represent a specific instance of the address information 222. Based on the search request 206, the context module 504 can determine the search context 202 representing that the user may be looking for a specific instance of the target destination 212. For a different example, the search request 206 can represent the category of interest 216 representing Vietnamese sandwich. The context module 504 can determine the search context 202 to represent that the user is hungry or looking for a place to eat.

For another example, the context module 504 can determine the search context 202 based on the location type 204 of FIG. 2. The location type 204 can include the current location 208 of FIG. 2, the starting location 210 of FIG. 2, the target destination 212, the point of interest 220, the geographic area 214 of FIG. 2, or a combination thereof.

For example, the context module 504 can determine the search context 202 of which region of the world the user is making the search request 206 based on the location type 204. For a specific example, the location unit 420 of FIG. 4 can determine the current location 208 of the user. The user can be originally from the United States. The current location 208 can represent that the user is in Germany. Based on the current location 208, the context module 504 can determine the search context 202 to represent that the user is making the search request 206 in Germany and not United States.

For a different example, the search request 206 can indicate that the starting location 210 is Germany and the target destination 212 can represent France. Based on the starting location 210 and the target destination 212, the context module 504 can determine the search context 202 to represent that the user is traveling from one country to another country in Europe. In contrast, if the starting location 210 is in Shanghai, China and the target destination 212 is Beijing, China, the context module 504 can determine the search context 202 to represent that the user is traveling within China.

For a different example, the search request 206 can represent multiple instances of the point of interest 220. Each instance of the point of interest 220 can represent a tourist attraction within London, United Kingdom. Based on the point of interest 220, the context module 504 can determine the search context 202 to represent that the user is touring within London.

For a different example, the current location 208 can represent the geographic area 214 of Western Europe. Based on the geographic area 214, the context module 504 can determine the search context 202 to represent the geographic area 214 of Western Europe.

For another example, the context module 504 can determine the search context 202 based on the category of interest 216. More specifically as an example, the category of interest 216 can represent a specific instance of the brand name 218 representing Alexander McQueen. Based on the brand name 218, the context module 504 can determine the search context 202 to represent that the user is searching for the category of interest 216 representing fashion by British designer. The context module 504 can communicate the search context 202 to a pattern module 506.

The navigation system 100 can include the pattern module 506, which can couple to the context module 504. The pattern module 506 determines the result pattern 304 of FIG. 3. For example, the pattern module 506 can determine the result pattern 304 based on the search context 202, the activity history 316 of FIG. 3, the suggestion type 308 of FIG. 3, or a combination thereof.

The pattern module 506 can determine the result pattern 304 in a number of ways. For example, the search context 202 can represent that the user is in Germany. In Germany, the result pattern 304 for the address information 222 can represent street name before the house or building number. Based on the search context 202, the pattern module 506 can determine the result pattern 304 for the search result 224 while the user is in Germany to represent the result pattern 304 of street name before the house or building number.

In contrast, the search context 202 can change from Germany to France. In France, the result pattern 304 for the address information 222 can represent the house or building number before the street name. Based on the search context 202, the pattern module 506 can determine the result pattern 304 for the search result 224 while the user is in France to represent the result pattern 304 of the house or building number before the street name.

For a different example, the pattern module 506 can determine the result pattern 304 based on the activity history 316. More specifically as an example, the activity history 316 can represent that the search request 206 made in the past represents restaurant names rather than street names. Based on the activity history 316, the pattern module 506 can determine the result pattern 304 to represent the category of interest 216 over the address information 222. More specifically as an example, the pattern module 506 can determine the result pattern 304 to represent the restaurant name over the street name.

For another example, the activity history 316 can indicate that the user enters the street name before the building number as the search request 206. Based on the activity history 316, the pattern module 506 can determine the result pattern 304 to represent the street name before the building number.

For another example, the activity history 316 can indicate that the user makes the search request 206 to obtain the search result 224 for a particular instance of the geographic area 214 over another instance of the geographic area 214. The geographic area 214 can represent China for the particular instance of the geographic area 214 where the user makes the search request 206. In China, the address information 222 can include the provincial name before the street name. Based on the activity history 316, the pattern module 506 can determine the result pattern 304 to represent the provincial name before the street name.

For a different example, the pattern module 506 can determine the result pattern 304 based on the suggestion type 308, the search context 202, the activity history 316, or a combination thereof. The suggestion type 308 can include the autosuggestion 310 of FIG. 3, the word complete 312 of FIG. 3, or a combination thereof.

For a specific example, the pattern module 506 can determine the result pattern 304 including the suggestion type 308 based on the search context 202, the activity history 316, or a combination thereof. More specifically as an example, the search context 202 can represent that the user is in the geographic area 214 representing the United States. In the United States, the address information 222 can include the building number before the street name. The autosuggestion 310 can include the address information 222 in its entirety. More specifically as an example, the autosuggestion 310 can include the building number, the street name, the city, the state, the country, the postal code, or a combination thereof. Based on the search context 202 being in the United States, the pattern module 506 can determine the result pattern 304 to include the suggestion type 308 representing the autosuggestion 310.

In contrast, the search context 202 can represent that the user is in the geographic area 214 representing Germany. The word complete 312 can represent the search result 224 excluding the address information 222 in its entirety but rather the search result 224 including the result component 306 of FIG. 3 one by one. The result component 306 can represent subset of the full information. For example, if the address information 222 can include the address of the point of interest 220 in its entirety, the result component 306 can include the street name but not the building number or the city.

Based on the search context 202 being in Germany, the pattern module 506 can determine the result pattern 304 to include the suggestion type 308 representing the word complete 312. More specifically as an example, the pattern module 506 can determine the word complete 312 to represent the result component 306 for the street number suggested before the result component 306 representing the house or building number. The pattern module 506 can determine the result pattern 304 including the autosuggestion 310, the word complete 312, or a combination thereof based on the geographic area 214. The pattern module 506 can communicate the result pattern 304 to a dictionary module 508.

It has been discovered that the navigation system 100 determining the result pattern 304 based on the search context 202 improves the efficiency of presenting the search result 224 to the user. By tailoring the suggestion type 308 based on the search context 202, the navigation system 100 can present the suggestion type 308 of either the autosuggestion 310 or the word complete 312 with specific instance of the result component 306 ideal for the search context 202 dynamically. As a result, the navigation system 100 can improve the delivery of the search result 224 for safer operation of the first device 102, the navigation system 100, or a combination thereof.

The navigation system 100 can include the dictionary module 508, which can couple to the context module 504. The dictionary module 508 determines the dictionary type 318 of FIG. 3. For example, the dictionary module 508 can determine the dictionary type 318 based on the search context 202, the activity history 316, the result pattern 304, or a combination thereof.

The dictionary module 508 can determine the dictionary type 318 in a number of ways. For example, the dictionary type 318 can include the local dictionary 320 of FIG. 3, the generic dictionary 322 of FIG. 3, or a combination thereof. Based on the change in the search context 202, the dictionary module 508 can determine the dictionary type 318 suited for the search context 202.

For a specific example, the search context 202 can change from the current location 208 detected in the United States to the current location 208 detected in Germany. As discussed above, the result pattern 304 for the search context 202 in the United States can differ from the result pattern 304 for the search context 202 in Germany. More specifically as an example, when there is a change in the search context 202, the local dictionary 320 can be more suitable for the specific instance of the geographic area 214. As a result, the dictionary module 508 can prioritize the usage of the dictionary type 318 representing the local dictionary 320 over the generic dictionary 322.

For a different example, the dictionary module 508 can determine the usage of the generic dictionary 322 based on the activity history 316. More specifically as an example, the dictionary module 508 can determine the usage of the generic dictionary 322 based on the selection count 324 of FIG. 3 of the search result 224 below the selection threshold 326 of FIG. 3. If the selection count 324 for the search result 224 generated based on the local dictionary 320 is below the selection threshold 326, the dictionary module 508 can determine that the user did not prefer the search result 224 generated based on the local dictionary 320. As a result, the dictionary module 508 can select the generic dictionary 322 over the local dictionary 320.

In contrast, if the selection count 324 for the search result 224 generated based on the local dictionary 320 is meets or exceeds the selection threshold 326, the dictionary module 508 can determine that the user prefers the search result 224 generated based on the local dictionary 320. As a result, the dictionary module 508 can select the local dictionary 320 over the generic dictionary 322. The dictionary module 508 can communicate the dictionary type 318 to a result module 510.

The navigation system 100 can include the result module 510, which can couple to the dictionary module 508. The result module 510 generates the search result 224. For example, the result module 510 can generate the search result 224 based on the result pattern 304, the dictionary type 318, the suggestion type 308, the search context 202, or a combination thereof.

The result module 510 can generate the search result 224 in a number of ways. For example, the result module 510 can generate the search result 224 represented in the result pattern 304 suited for the search context 202. More specifically as an example, the search context 202 can represent that the user is in Germany. As discussed above, the result pattern 304 can include the word complete 312 for the search context 202 for Germany.

If the result pattern 304 to be used represents the word complete 312, the result module 510 can generate the search result 224 including the suggestive component 314 of FIG. 3. More specifically as an example, as the user makes the search request 206 of entering each character to obtain the search result 224, the result module 510 can generate the search result 224 representing the suggestive component 314 rather than the suggestive result 302 of FIG. 3.

For example, the search request 206 can represent "Niede". The entry count 330 of FIG. 3 of the search request 206 can represent five entries to represent five characters entered. The result module 510 can generate the suggestive component 314 based on the result component 306 of the word complete 312 suited for the search context 202. More specifically as an example, the result module 510 can generate the suggestive component 314 based on the local dictionary 320 for the search context 202. For a specific example, based on "Niede," the result module 510 can generate multiple instances of the suggestive component 314 representing "Niederkirchnerstraße," "Neidenstein," "Neidenbach," "Neideckstraße," or a combination thereof.

Based on the suggestive component 314, the search request 206 can be made to select the suggestive component 314. For example, if the user makes another instance of the search request 206 by selecting "Niederkirchnerstraße," the result module 510 can generate a subsequent instance of the suggestive component 314 representing "Niederkirchnerstraße 7, 10963 Berlin." The user can make another instance of the search request 206 to select "Niederkirchnerstraße 7, 10963 Berlin." Based on aggregating the multiple instances of the suggestive component 314 selected, the result module 510 can generate the search result 224 representing the address information 222 in its entirety. More specifically as an example, the result module 510 can generate the search result 224 representing the address information 222 in its entirety interested by the user after the entry count 330 of seven entries.

In contrast, the result pattern 304 to be used can represent the autosuggestion 310. The search context 202 can represent that the user in the United States. The result module 510 can generate the search result 224 representing the suggestive result 302 based on the result pattern 304 including the autosuggestion 310. In the case of the autosuggestion 310, as an example, the result module 510 can generate the suggestive result 302 representing the address information 222 in its entirety.

More specifically as an example, the search request 206 can represent "27 El Camino Real". The entry count 330 of the search request 206 can represent 17 entries to represent 17 characters entered. The result module 510 can generate the suggestive result 302 based on the autosuggestion 310 suited for the search context 202. The suggestive result 302 can include the result component 306 subsequent to the 17th character of the search request 206.

More specifically as an example, the result module 510 can generate the suggestive result 302 based on the generic dictionary 322, the local dictionary 320, or a combination thereof. For a specific example, based on "27 El Camino Real" the result module 510 can generate multiple instances of the suggestive result 302 representing "27 El Camino Real, Santa Clara, Calif.," "27 El Camino Real, San Bruno, Calif.," "27 El Camino Real Burlingame, Calif.," "27 El Camino Real, Berkeley, Calif.," "27 El Camino Real, San Francisco, Calif.," or a combination thereof.

The user can make another instance of the search request 206 to select "27 El Camino Real, Santa Clara, Calif." More specifically as an example, the result module 510 can generate the search result 224 representing the address information 222 in its entirety interested by the user after the entry count 330 of the 17th character.

It has been discovered that the navigation system 100 can improve the safety of operating the first device 102, the navigation system 100, or a combination thereof by increasing or decreasing the entry count 330 made for the search request 206 to obtain the search result 224. More specifically as an example, by determining the suggestion type 308 suited for the search context 202, the navigation system 100 can determine the result pattern 304 most efficient for the search context 202. As a result, the navigation system 100 can improve the safety of operating the first device 102, the navigation system 100, or a combination thereof by controlling the entry count 330 necessary to obtain the search result 224 desired by the user, thus, reducing the user's distraction from making unnecessary instance of the search request 206.

For a different example, the result module 510 can generate the search result 224 based on the location type 204, the selection count 324, or a combination thereof. More specifically as an example, the current location 208 can represent Seattle, Wash. The search request 206 can represent "sta." Based on the activity history 316 of the users of the navigation system 100, the point of interest 220 representing Starbucks Coffee™ can have the highest instance of the selection count 324 amongst other instances of the search result 224 for the point of interest 220 in response to the search request 206 of "sta" for the geographic area 214. As a result, the result module 510 can generate the search result 224 representing Starbucks Coffee™ for the current location 208 detected in Seattle.

In contrast, the current location 208 can represent Fremont, Calif. The search request 206 can represent "sta." Based on the activity history 316 of the users of the navigation system 100, the point of interest 220 representing Starr Street can have the highest instance of the selection count 324 amongst other instances of the search result 224 for the point of interest 220 in response to the search request 206 of "sta" for the geographic area 214. As a result, the result module 510 can generate the search result 224 representing Starr Street for the current location 208 detected in Fremont. The result module 510 can generate the search result 224 tailored to the location type 204 where the search request 206 is made.

For a different example, the result module 510 can generate multiple instances of the search result 224 based on the location type 204, the selection count 324, the match degree 336 of FIG. 3, or a combination thereof. More specifically as an example, the result module 510 can generate the search result 224 based on the match degree 336 between the search request 206 and the dictionary content of the generic dictionary 322, the local dictionary 320, or a combination thereof.

For a specific example, the result module 510 can prioritize the search result 224 based on the match degree 336. More specifically as an example, the search result 224 with the match degree 336 of an exact match can represent the highest priority. The result module 510 can rank the multiple instances of the search result 224 based on comparing the match degree 336 of each instance of the search result 224 to one another. More specifically as an example, the result module 510 can compare the match degree 336 using the string match algorithm. The search result 224 with less degree of matching can be ranked lower than the search result 224 with higher degree of matching.

For a different example, the result module 510 can generate the search result 224 based on the entry count 330. More specifically as an example, the result module 510 can generate the search result 224 including the character count 332 of FIG. 3 meeting or exceeding the count threshold 334 of FIG. 3. The count threshold 334 can represent the minimum number of characters that exceed the entry count 330.

For a specific example, if the entry count 330 represents three characters, the count threshold 334 can be set at five characters. Based on the count threshold 334, the result module 510 can generate the search result 224 having the character count 332 meeting or exceeding five characters.

For further example, the count threshold 334 can differ based on the search context 202. For example, the count threshold 334 for the geographic area 214 representing Germany can be greater than the count threshold 334 for the geographic area 214 representing the United States to accommodate the higher number of the character count 332 of the German words. The result module 510 can generate the search result 224 based on the character count 332 meeting or exceeding the count threshold 334 tailored to the search context 202. The result module 510 can adjust the count threshold 334 to suit the search context 202. The result module 510 can communicate the search result 224 to a display module 512.

It has been discovered that the navigation system 100 generating the search result 8 based on the character count 332 meeting or exceeding the count threshold 334 tailored to the search context 202 improves the accuracy of presenting the search result 224 to the user. By adjusting the count threshold 334 specific to the search context 202 dynamically, the navigation system 100 can filter the search result 224 irrelevant to the search context 202. As a result, the navigation system 100 can improve the safety of the user operating the first device 102, the navigation system 100, or a combination thereof by efficiently providing the search result 224.

The navigation system 100 can include the display module 512, which can couple to the result module 510. The display module 512 presents the search result 224. For example, the display module 512 can display the search result 224 based on receiving the search request 206.

The display module 512 can present the search result 224 in a number of ways. As discussed above, the search result 224 generated by the result module 510 can be viewable via the display module 512. More specifically as an example, the display module 512 can display the search result 224 including the suggestive result 302, the suggestive component 314, or a combination thereof in response to the search request 206.

For example, the display module 512 can receive the search request 206 representing a gesture. More specifically as an example, the search request 206 can swipe to the left or right to view additional instances of the search result 224 generated.

For a different example, the display module 512 can generate the navigation output 226 of FIG. 2 based on the suggestion type 308. More specifically as an example, the display module 512 can generate the navigation output 226 based on the user selecting the search result 224 representing the suggestive result 302. The suggestive result 302 can represent the address information 222 to the target destination 212. The display module 512 can generate the navigation output 226 representing a route, for example, to be displayed on the first device 102 to guide the user to reach the target destination 212.

In contrast, if the suggestive component 314 is selected, the display module 512 can display the subsequent instance of the suggestive component 314 for the user to select. If the aggregation of multiple instances of the suggestive component 314 becomes the suggestive result 302, for example the address information 222, the selection of the suggestive result 302 can result in the display module 512 generating the navigation output 226 as discussed above.

The physical transformation from traveling from one instance of the geographic area 214 to another instance of the geographic area 214 results in the movement in the physical world, such as people using the first device 102, the vehicle, or a combination thereof, based on the operation of the navigation system 100. As the movement in the physical world occurs, the movement itself creates additional information that is converted back into determining the search context 202, the result pattern 304, the dictionary type 318, or a combination thereof and generating the search result 224 for the continued operation of the navigation system 100 and to continue the movement in the physical world.

The first software 426 of FIG. 4 of the first device 102 of FIG. 4 can include the modules for the navigation system 100. The first software 426 can include the entry module 502, the context module 504, the pattern module 506, the dictionary module 508, the result module 510, and the display module 512.

The first control unit 412 of FIG. 4 can execute the first software 426 for executing the entry module 502 to receive the search request 206. The first control unit 412 can execute the first software 426 for executing the context module 504 to determine the search context 202. The first control unit 412 can execute the first software 426 for executing the pattern module 506 to determine the result pattern 304.

The first control unit 412 can execute the first software 426 for executing the dictionary module 508 to determine the dictionary type 318. The first control unit 412 can execute the first software 426 for executing the result module 510 to generate the search result 224. The first control unit 412 can execute the first software 426 for executing the display module 512 to present the search result 224.

The second software 442 of FIG. 4 of the second device 106 of FIG. 4 can include the modules for the navigation system 100. The second software 442 can include the entry module 502, the context module 504, the pattern module 506, the dictionary module 508, the result module 510, and the display module 512.

The second control unit 434 of FIG. 4 can execute the second software 442 for executing the entry module 502 to receive the search request 206. The second control unit 434 can execute the second software 442 for executing the context module 504 to determine the search context 202. The second control unit 434 can execute the second software 442 for executing the pattern module 506 to determine the result pattern 304.

The second control unit 434 can execute the second software 442 for executing the dictionary module 508 to determine the dictionary type 318. The second control unit 434 can execute the second software 442 for executing the result module 510 to generate the search result 224. The second control unit 434 can execute the second software 442 for executing the display module 512 to present the search result 224.

The modules of the navigation system 100 can be partitioned between the first software 426 and the second software 442. The second software 442 can include the context module 504, the pattern module 506, the dictionary module 508, and the result module 510. The second control unit 434 can execute the modules partitioned on the second software 442 as previously described.

The first software 426 can include the entry module 502 and the display module 512. Based on the size of the first storage unit 414, the first software 426 can include additional modules of the navigation system 100. The first control unit 412 can execute the modules partitioned on the first software 426 as previously described.

The first control unit 412 can operate the first communication unit 416 of FIG. 4 to communicate the search request 206, the search context 202, the result pattern 304, the dictionary type 318, the search result 224, or a combination thereof to or from the second device 106. The first control unit 412 can operate the first software 426 to operate the location unit 420. The second control unit 434 can operate the second communication unit 436 of FIG. 4 to communicate the search request 206, the search context 202, the result pattern 304, the dictionary type 318, the search result 224, or a combination thereof to or from the first device 102 through the communication path 104 of FIG. 4.

The first control unit 412 can operate the first user interface 418 of FIG. 4 to present the digital representation of the search request 206, the search context 202, the result pattern 304, the dictionary type 318, the search result 224, or a combination thereof. The second control unit 434 can operate the second user interface 438 of FIG. 4 to present the digital representation of the search request 206, the search context 202, the result pattern 304, the dictionary type 318, the search result 224, or a combination thereof.

The navigation system 100 describes the module functions or order as an example. The modules can be partitioned differently. For example, the result module 510 and the display module 512 can be combined. Each of the modules can operate individually and independently of the other modules. Furthermore, data generated in one module can be used by another module without being directly coupled to each other. For example, the result module 510 can receive the search context 202 from the context module 504. Further, "communicating" can represent sending, receiving, or a combination thereof the data generated to or from one to another.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively.

The modules described in this application can be implemented as instructions stored on a non-transitory computer readable medium to be executed by the first control unit 412, the second control unit 434, or a combination thereof. The non-transitory computer medium can include the first storage unit 414 of FIG. 4, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
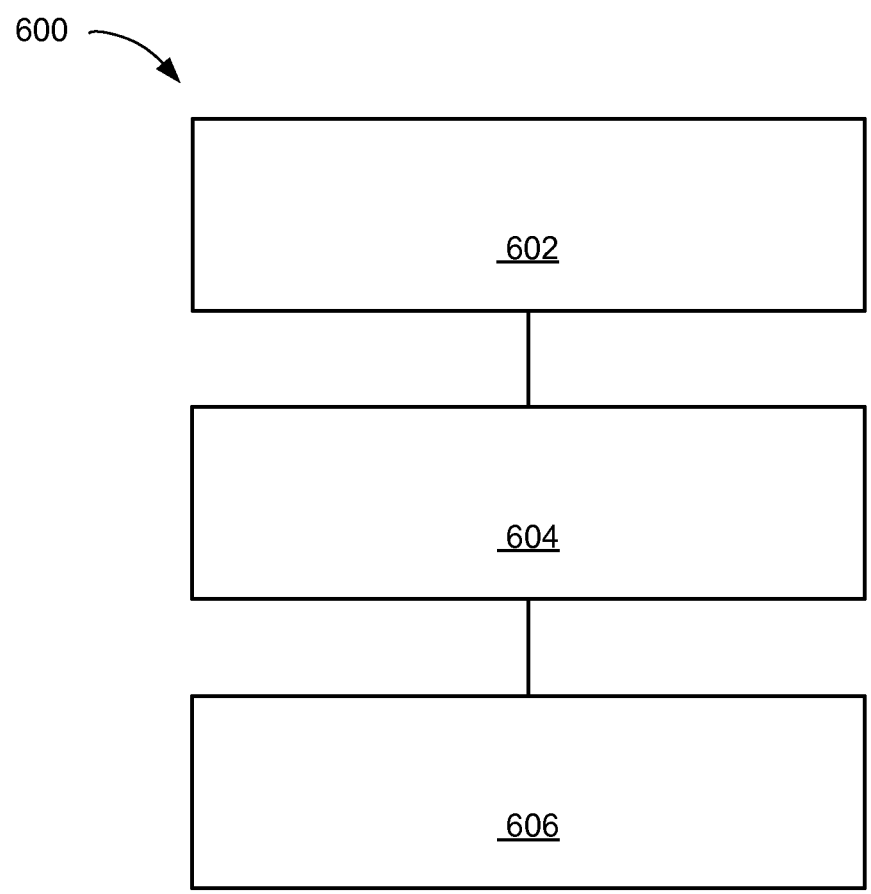
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a search context with a control unit for identifying the search context where a search request is made in a block 602; determining a result pattern including a word complete over an autosuggestion based on the search context in a block 604; and generating a search result including a suggestive component based on the result pattern for displaying on a device in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   determining a search context based on a location type including a current location with a control unit for identifying the search context where a search request is made;
   selecting a suggestion type including an autosuggestion, a word complete, or a combination thereof based on the search context for determining a result pattern wherein the word complete represents a cartel recommendation and the autosuggestion represents a complete recommendation;
   determining whether to use a dictionary type of a local dictionary or a generic dictionary based on whether a selection count meets or is below a selection threshold wherein the local dictionary represents a dictionary tailored for the specific instance of the location type and the generic dictionary represent the dictionary unspecific to the location type;
   adjusting a count threshold according to the search context representing a geographic area for accommodating a character count suited for the geographic area; and
   generating a search result including a suggestive component or a suggestive result based on the result pattern, the suggestion type, tae dictionary type, the count threshold adjusted for displaying on a device;
   wherein;
   the selection count is a number of selecting of search results; and
   the geographic area includes the current location.

2. The method as claimed in claim 1 further comprising determining the result pattern including the autosuggestion over the word complete based on a search context different tom the search context determined for selecting the word complete over the autosuggestion or vice versa.

3. The method as claimed in claim 1 wherein:
   adjusting the count threshold includes adjusting the count threshold to exceed an entry count based on the search context; and
   generating the search result includes generating the search result including the character count meeting or exceeding the count threshold for filtering the search result unsuited for the search context.

4. The method as claimed in claim 1 further comprising determining the dictionary type based on the selection count meeting or exceeding the selection threshold for selecting the dictionary type suited for the search context.

5. The method as claimed in claim 1 wherein generating the search result includes generating the search result based on aggregating multiple instances of the suggestive component selected.

6. The method as claimed in claim 1 further comprising ranking multiple instances of the search result based on comparing a match degree of one instance of the search result to another instance of the search result.

7. The method as claimed in claim 1 wherein determining the search context includes determining the search context based on the location type of where the search request is made.

8. The method as claimed in claim 1 further comprising determining the result pattern based on an activity history of how the search request is made.

9. The method as claimed in claim 1 further comprising determining the result pattern to include the suggestion type of the autosuggestion, the word complete, or a combination hereof based on the search context where the search request is made.

10. The method as claimed in claim 1 further comprising:
    changing the search context based on a change in the current location detected; and
    prioritizing one instance of the dictionary type of another instance of the dictionary type based on changing the search context.

11. A navigation system comprising:
    a control unit including a processor for:
    determining a search context based on a location type including a current location with a control unit for identifying the search context where a search request is made,
    selecting a suggestion type including an autosuggestion, a word complete, or a combination hereof based on the search context for determining a result pattern wherein the word complete represents a partial recommendation and the autosuggestion represents a complete recommendation,
    determining whether to use a dictionary type of a local dictionary or a generic dictionary based on whether a selection count meets or is below a selection threshold wherein the local dictionary represents a dictionary tailored for the specific instance of the location type and the generic dictionary represents the dictionary unspecific to the location type,
    adjusting a count threshold according to the search context representing a geographic area for accommodating a character count suited for the geographic area,
    generating a search result including a suggestive component or a suggestive result based on the result pattern, the suggestion type, the dictionary type, the count threshold adjusted, and
    a communication unit including a microelectronic, coupled to the control unit, for communicating the search result for displaying on a device;
    wherein:
    the selection count is a number of selecting of search result; and
    the geographic area includes the current location.

12. The system as claimed in claim 11 wherein the control unit is for determining the result pattern including the autosuggestion over the word complete based on a search context different from the search context determined for selecting the word complete over the autosuggestion or vice versa.

13. The system as claimed in claim 11 wherein the control unit is for:
    adjusting the count threshold to exceed an entry count based on the search context; and
    generating the search result including the character count meeting or exceeding the count threshold for filtering the search result unsuited for the search context.

14. The system as claimed in claim 11 wherein the control unit is for determining the dictionary type based on the selection count meeting or exceeding the selection threshold for selecting the dictionary type suited for the search context.

15. The system as claimed in claim 11 wherein the control unit is for generating the search result based on aggregating multiple instances of the suggestive component selected.

16. A non-transitory computer readable medium including instructions for execution, the instructions comprising:

determining a search context based on a location type including a current location for identifying the search context where a search request is made;

selecting a suggestion type including an autosuggestion, a word complete, or a combination hereof based on the search context for determining a result pattern wherein the word complete represents a partial recommendation and the autosuggestion represents a complete recommendation;

determining whether to use a dictionary type of a local dictionary or a generic dictionary based on whether a selection count meets or is below a selection threshold wherein the local dictionary represents a dictionary tailored for the specific instance of the location type and the generic dictionary represents the dictionary unspecific to the location type;

adjusting a count threshold according to the search context representing a geographic area for accommodating a character count suited for the geographic area; and generating a search result including a suggestive component or a suggestive result based on the result pattern, the suggestion type, the dictionary type, the count threshold adjusted for displaying device;

wherein:

the selection count is a number of selecting of search result; and the geographic area includes the current location.

17. The non-transitory computer readable medium as claimed in claim 16 further comprising determining the result pattern including the autosuggestion over the word complete based on a search context different from the search context determined for selecting the word complete over the autosuggestion or vice versa.

18. The non-transitory computer readable medium as claimed in claim 16 wherein:

adjusting the count threshold to exceed an entry count based on the search context; and generating the search result includes generating the search result including the character count meeting or exceeding the count threshold for filtering the search result unsuited for the search context.

19. The non-transitory computer readable medium as claimed in claim 16 further comprising determining the dictionary type based on the selection count meeting or exceeding the selection threshold for selecting the dictionary type suited for the search context.

20. The non-transitory computer readable medium as claimed in claim 16 wherein generating the search result includes generating the search result based on aggregating multiple instances of the suggestive component selected.

* * * * *